US010301499B2

(12) United States Patent
Kim (10) Patent No.: US 10,301,499 B2
(45) Date of Patent: May 28, 2019

(54) METHOD OF APPLYING PTFE COATING SOLUTION AND VEHICLE PART COATED WITH PTFE COATING SOLUTION

(71) Applicants: HYUNDAI MOTOR COMPANY, Seoul (KR); KIA MOTORS CORPORATION, Seoul (KR)

(72) Inventor: Yool Koo Kim, Ansan-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 200 days.

(21) Appl. No.: 15/179,608

(22) Filed: Jun. 10, 2016

(65) Prior Publication Data

US 2017/0166773 A1    Jun. 15, 2017

(30) Foreign Application Priority Data

Dec. 10, 2015    (KR) .................. 10-2015-0176374

(51) Int. Cl.
*C09D 127/18*    (2006.01)
*F02F 3/10*    (2006.01)
*C08K 3/04*    (2006.01)

(52) U.S. Cl.
CPC ............ *C09D 127/18* (2013.01); *F02F 3/10* (2013.01); *C08K 3/04* (2013.01); *C08K 2201/005* (2013.01); *C08K 2201/009* (2013.01)

(58) Field of Classification Search
None
See application file for complete search history.

(56) References Cited

U.S. PATENT DOCUMENTS

| 5,239,955 A * | 8/1993 | Rao .................. F02B 77/02 |
| | | 123/193.4 |
| 2007/0117911 A1 | 5/2007 | Irwin et al. |
| 2008/0152405 A1 | 6/2008 | Kuntz et al. |

(Continued)

FOREIGN PATENT DOCUMENTS

| JP | H10-139412 A | 5/1998 |
| JP | 2007-509279 A | 4/2007 |

(Continued)

OTHER PUBLICATIONS

Korean Office Action dated Dec. 12, 2016 issued in Korean Patent Application No. 10-2015-0176374.

(Continued)

*Primary Examiner* — Michael P. Rodriguez
(74) *Attorney, Agent, or Firm* — Morgan Lewis & Bockius LLP (57) ABSTRACT

A method of applying a PTFE (polytetrafluoroethylene) solution includes a dispersion step of dispersing a diamond powder in an organic solvent using bead milling to manufacture a dispersion solution, a mixing step of mixing a silane solution with the dispersion solution to manufacture a mixture solution, an addition step of adding the PTFE solution including PTFE particles having a size of 0.1 to 6 μm to the mixture solution to manufacture a coating solution, a coating step of applying the manufactured coating solution on a surface of a piston skirt to form a coated layer including a plurality of dimples distributed thereon, and a curing step of drying and heat-treating the coated layer.

7 Claims, 6 Drawing Sheets

(56) References Cited

U.S. PATENT DOCUMENTS

2010/0233371 A1* 9/2010 Kim .................. B05D 5/083
                                                    427/290
2014/0047974 A1* 2/2014 Sugimoto .............. F16J 9/26
                                                    92/172
2015/0065405 A1   3/2015 Sawyer et al.

FOREIGN PATENT DOCUMENTS

| | | |
|---|---|---|
| JP | 3913118 B2 | 5/2007 |
| JP | 2010255038 A | 11/2010 |
| JP | 2013-227913 A | 11/2013 |
| JP | 2015-025382 A | 2/2015 |
| KR | 10-0703881 B1 | 3/2007 |
| KR | 10-2007-0081566 A | 8/2007 |
| KR | 10-2004-38726 Y1 | 3/2008 |
| KR | 10-2008-0063226 A | 7/2008 |
| KR | 10-2008-0093625 A | 10/2008 |
| KR | 10-2010-0103242 A | 9/2010 |
| KR | 10-2012-0016109 A | 2/2012 |
| KR | 10-2012-0053896 A | 5/2012 |
| KR | 101275517 B1 * | 7/2013 |

OTHER PUBLICATIONS

L. Pil, "A Study on the Tribological Behavior of Nanodiamond Added PTFE Based Composite Coating," Korea University Graduate School Dept. of Materials Science and Engineering, Dec. 12, 2006.

Park, et al., "Effect of Surface Modification of Nandiamond Using a Amino Functional Silance Coupling Agent on the Tribological Properties of PTFE-nanodiamond Composite Coating," Korean Society of Tribologists and Lubrication Engineers, 2007 45th Annual Fall Conference and Automotive Tribology Symposium/Regular Meeting, 2007, pp. 203-214.

Korean Notice of Allowance dated Jun. 19, 2017 issued in Korean Patent Application No. 10-2015-0176374.

* cited by examiner

METHOD OF APPLYING PTFE COATING SOLUTION AND VEHICLE PART COATED WITH PTFE COATING SOLUTION

CROSS REFERENCE TO RELATED APPLICATION

The present application claims the benefit of priority to Korean Patent Application No. 10-2015-0176374, filed Dec. 10, 2015 with the Korean Intellectual Property Office, the entire contents of which is incorporated herein for all purposes by this reference.

TECHNICAL FIELD

The present disclosure relates to a method of applying a PTFE coating solution to control a particle size of the PTFE solution to form a coated layer, the layer including a plurality of dimples formed on a surface thereof whereby the dimples act as oil pockets.

BACKGROUND

Pistons are parts that are vulnerable to friction, and cause 30 to 50% of engine frictional energy losses. Particularly, the piston's reciprocation causes friction with the internal surface of the cylinder under a pressure of 30 to 40 MPa during an explosion stroke of the engine. Resin including a solid lubricant, such as graphite and $MoS_2$, can be applied on the surface of the piston skirt in order to minimize frictional losses.

A PTFE coating solution has been used as a coating agent or a lubricant in the industrial world. For the PTFE coating solution, diamond powder is subjected to bead milling, dispersed in an organic solvent, and mixed with a silane solution to surround the diamond powder particles with the silane solution to manufacture a mixture solution including the diamond powder particles. In such a solution, the diamond powder particles are not agglomerated but dispersed to have a nano size within the solution, and a PTFE (polytetrafluoroethylene) solution having an excellent low-friction property is then added to the mixture solution to obtain the PTFE coating solution.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

Accordingly, the present disclosure has been made keeping in mind the above problems occurring in the related art, and an object of the present disclosure is to provide a method of applying a PTFE coating solution to control a particle size of the PTFE solution to form a coated layer including a plurality of dimples formed on a surface thereof whereby the dimples act as oil pockets, thereby maximizing a friction reduction effect.

In order to accomplish the above object, the present disclosure provides a method of applying a PTFE (polytetrafluoroethylene) solution, including a dispersion step of dispersing a diamond powder in an organic solvent using bead milling to manufacture a dispersion solution, a mixing step of mixing a silane solution with the dispersion solution to manufacture a mixture solution, an addition step of adding the PTFE solution including PTFE particles having a size of 0.1 to 6 µm to the mixture solution to manufacture a coating solution, a coating step of applying the manufactured coating solution on a surface of a piston skirt to form a coated layer and a curing step of drying and then heat-treating the coated layer.

The plurality of dimples may each have a diameter of 50 to 350 µm.

A particle size of the diamond powder dispersed in the organic solvent using the bead milling may be 100 to 400 nm during the dispersion step.

100 parts by weight of the organic solvent and 5 to 10 parts by weight of the diamond powder may be mixed to manufacture the dispersion solution during the dispersion step.

The silane solution may have an amino functional group during the mixing step.

100 parts by weight of the diamond powder and 2 to 6 parts by weight of the silane solution may be mixed to manufacture the mixture solution during the mixing step.

The coating solution manufactured during the addition step may have a viscosity of 20000 to 26000 cps.

The heat-treating may be performed at 200 to 220° C. for 10 to 20 min during the curing step.

In order to accomplish the above object, the present disclosure also provides a vehicle part coated with a PTFE coating solution. The vehicle part includes a piston skirt, and a coated layer formed on a surface of the piston skirt using a coating solution which includes a dispersion solution including diamond powder dispersed in an organic solvent, a silane solution, and a PTFE solution including PTFE (polytetrafluoroethylene) particles having a size of 0.1 to 6 µm.

A plurality of dimples each having a diameter of 50 to 350 µm may be distributed on a surface of the coated layer.

The density of the plurality of distributed dimples may be 0.5 to 10 dimples/$mm^2$.

According to the method of applying the PTFE coating solution according to the present disclosure, the plurality of dimples acting as the oil pockets can be formed on the surface of the coated layer of the piston skirt to maximize a reduction in friction.

The friction coefficient of the piston skirt is about 33% lower than that of a known substance, and accordingly, fuel efficiency of a vehicle is about 0.3% improved. Fuel efficiency can be expected to be improved by only replacing the coating solution without necessitating a reduction in weight of a vehicle body.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Hereinafter, a detailed description will be given of embodiments of the present disclosure, with reference to the appended drawings.

A method of applying a PTFE (polytetrafluoroethylene) coating solution according to the present disclosure may include a dispersion step of dispersing a diamond powder in an organic solvent using bead milling to manufacture a dispersion solution, a mixing step of mixing a silane solution with the dispersion solution to manufacture a mixture solution, an addition step of adding the PTFE solution including PTFE particles having a size of 0.1 to 6 μm to the mixture solution to manufacture a coating solution, a coating step of applying the manufactured coating solution on a surface of a piston skirt to form a coated layer including a plurality of dimples distributed thereon and a curing step of drying and then heat-treating the coated layer.

When the coating solution including the diamond powder, the organic solvent, the silane solution, and the PTFE solution is applied on the surface of the piston skirt to form the coated layer, the size of the PTFE particle of the PTFE solution may be controlled to intentionally form bubble marks caused by an orange peel phenomenon on the surface of the coated layer, thus randomly distributing the plurality of dimples having a micro unit size, unlike the related art. The plurality of dimples having the micro unit size may be distributed on the surface of the coated layer to add a texturing effect caused by bubbles to a friction reduction effect of PTFE, thereby maximizing a reduction in friction of the piston skirt. The method of applying the PTFE coating solution according to the present disclosure will be described in stages below.

The diamond powder may be dispersed in the organic solvent during the dispersion step. Preferably, powder including particles having a diameter of 10 to 100 nm distributed therein may be used as the diamond powder, and preferably, NMP (N-methyl pyrrolidone), which is a polar organic solvent, may be used as the organic solvent. NMP is compatible with the PTFE solution, has a high boiling point (204° C.), is not easily volatilized during bead milling, and not scattered and ignited at 60 to 70° C., which is a silane treatment temperature, and is thus preferred to other organic solvents.

Further, the organic solvent may be provided in order to adjust viscosity according to a change in size of the PTFE particle. Therefore, the viscosity may be reduced regardless of the size of the PTFE particle when the organic solvent including NMP, MIBK (methylisobutylketone), and xylene mixed with each other is used. Accordingly, the organic solvent including NMP and MIBK mixed with each other may be preferably used, and only NMP may be more preferably used in order to secure the viscosity at which the coated layer having a sufficient thickness is formed on the surface of the piston skirt.

The diamond powder distributed in the organic solvent using bead milling may be preferably added in a content of 5 to 10 parts by weight based on 100 parts by weight of the organic solvent. When the content of the diamond powder is less than 5 parts by weight based on 100 parts by weight of the organic solvent, milling efficiency may be low, and when the content is more than 10 parts by weight, the viscosity may be increased to make it difficult to separate the diamond powder from beads after milling. Therefore, the content of the diamond powder may be limited to 5 to 10 parts by weight based on 100 parts by weight of the organic solvent.

Preferably, the diameter of the bead used during milling is in the range of 0.1 to 0.3 mm. This is because when the diameter of the bead is less than 0.1 mm, milling efficiency may be favorable but it may be difficult to separate the powder after milling, causing significant loss, and when the diameter is more than 0.5 mm, milling efficiency may be reduced to prevent nano size particles from being obtained. The material of the bead is not particularly limited, but zirconia beads may be used as an example.

Next, the dispersion solution manufactured during the dispersion step may be mixed with the silane solution during the mixing step. In the method of applying the PTFE coating solution according to an embodiment of the present disclosure, preferably, a solution having an amino group as an organic functional group may be used as the silane solution. More preferably, aminopropyl-trimethoxysilane (ATS) may be used. The silane solution may include a methoxy group, which has excellent bonding strength to the diamond powder, which is an inorganic functional group, to be bonded to the surface of the diamond particle. Thus, agglomeration of the diamond particles may be prevented to improve dispersion strength.

The organic functional group bonds PTFE and PAI (binder), as will be described below, to improve wear resistance. Unshared electron pairs present in a N—H bond included in the amino group of ATS have an excellent bonding property to PTFE and may improve dispersibility of the diamond powder and maximize adhesion of PTFE and PAI.

In the method of applying the PTFE coating solution according to an embodiment of the present disclosure, preferably, the silane solution may be mixed in a content of 2 to 6 parts by weight with the dispersion solution based on 100 parts by weight of the diamond powder. The mixture solution may be then agitated at 60 to 70° C. for 5 to 7 hours. The addition content of the silane solution mainly depends on the surface area according to the particle size of the diamond powder particles, but the content of 2 to 6 parts by weight may be enough to form a monolayer on most surfaces of the diamond powder particles based on 100 parts by weight of the diamond powder. However, the case where the content is more than 6 parts by weight may not be preferable in that the silane solution remains in an excessive amount.

The reason why the temperature of the mixture solution is maintained at 60 to 70° C. is that a hydrolysis reaction of the silane solution may be induced to effectively surround the diamond powder particles. When the temperature is lower than 60° C., reactivity may be low, and when the temperature is higher than 70° C., volatility of the organic solvent may be increased. Further, when an agitation time is less than 5 hours, the hydrolysis reaction may be insufficient, and when the agitation time is more than 7 hours, the organic solvent may be volatilized in an excessive amount to significantly change a content ratio of the diamond powder to the organic solvent. Accordingly, it may be preferable to agitate the mixture solution for 5 to 7 hours.

The mixture solution including the dispersion solution and the silane solution mixed with each other may be added to the PTFE solution to manufacture the coating solution. The coating solution may be applied using a print screen process on a piston skirt of an engine benefitting from a maximized reduction in friction. The size of the PTFE particle of the PTFE solution added to the mixture solution may be limited to the range of 0.1 to 6 μm. The range may be limited to form a plurality of dimples on the surface of the coated layer when the coating solution is applied on the surface of the piston skirt.

The coating solution may be applied for the purpose of reducing friction on the surface of the piston skirt to prevent energy loss caused by friction of the engine, and the size of the PTFE particle may be controlled in order to use a bubble adsorption property of the PTFE particle, thereby forming the plurality of dimples on the surface of the coated layer.

Figure 1:
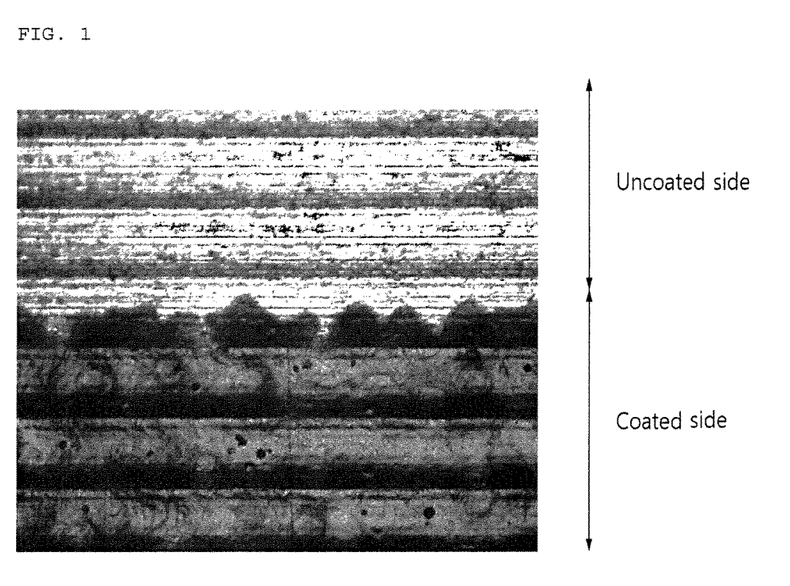
FIG. 1 is an enlarged picture showing an uncoated side and a coated layer of a surface of a piston skirt according to an embodiment of the present disclosure.

When the plurality of dimples is formed on the surface of the coated layer, the dimples may act as an oil pocket to allow the coated layer to contain a lubricant, thereby maximizing a reduction in friction. When the size of the PTFE particle is less than 0.1 μm, it may be difficult to manufacture the PTFE particle, and when the size of the PTFE particle is more than 6 μm, it may be difficult to form the plurality of dimples on the surface of the coated layer. Thus, it may be preferable to limit the size of the PTFE particle to the range of 0.1 to 6 μm. From FIG. 1, which is a picture comparing an uncoated side and a coated layer of a surface of the piston skirt, it can be confirmed that the size of the PTFE particle is controlled to form the plurality of dimples on the surface of the coated layer. Formation of the dimples can be confirmed even from FIG. 2, which is an enlarged picture showing a surface of a coated layer, and this is based on uniform distribution of the PTFE particles as in FIG. 3.

Figure 4:
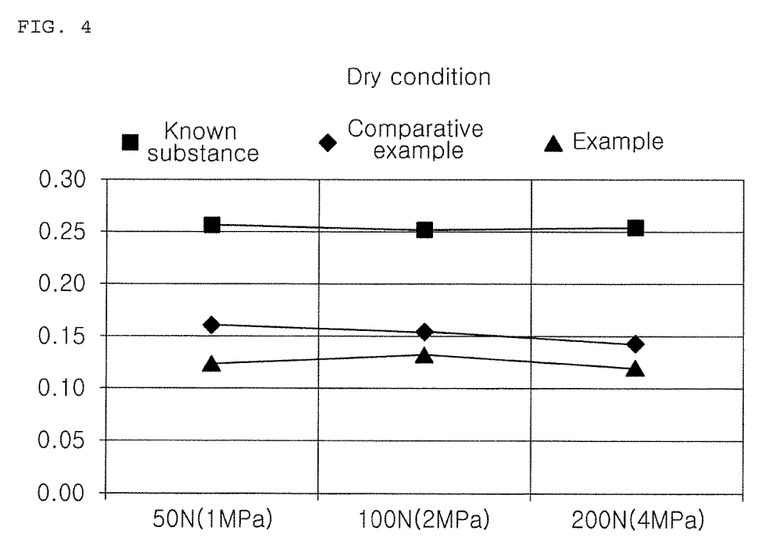
FIG. 4 is a graph comparing friction coefficients of a known substance, a comparative example, and an example under a dry condition according to an embodiment of the present disclosure.
Figure 5:
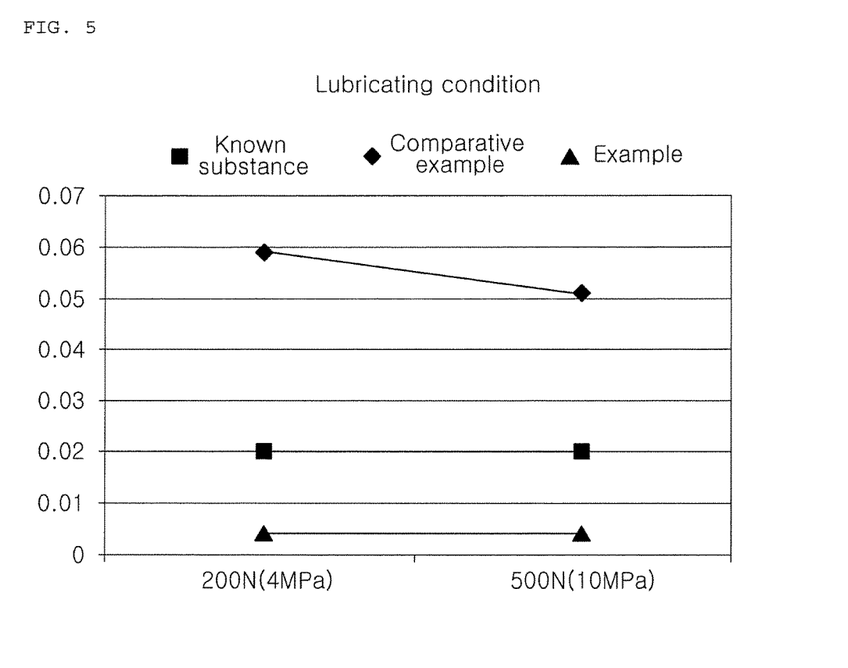
FIG. 5 is a graph comparing friction coefficients of a known material, a comparative example, and an example under a lubricating condition according to an embodiment of the present disclosure.

A reduction in friction of the piston skirt according to control of the size of the PTFE particle can be seen from FIGS. 4 and 5, which are graphs showing test results using TE77, which is a test device of the friction coefficient.

FIG. 4 is a graph comparing friction coefficients of a known substance including $MoS_2$ as a solid lubricant, a comparative example including PTFE having a particle size of 8 μm as the solid lubricant, and an example including PTFE having a particle size of 1 μm as the solid lubricant under a dry condition under which oil is not present. It can be confirmed that the friction coefficients of the comparative example and the example are smaller than that of the known substance, and the friction coefficient of the example is smaller than that of the comparative example under all loads even though a difference between the example and the comparative example is not significant.

FIG. 5 is a graph comparing the friction coefficients of a known substance including $MoS_2$ as the solid lubricant, a comparative example including PTFE having the particle size of 8 μm as the solid lubricant, and an example including PTFE having the particle size of 1 μm as the solid lubricant under a lubricating condition under which oil is present. It can be confirmed that the friction coefficient of the example is even lower than that of the known substance and the comparative example compared to the dry condition. This is because the size of the PTFE particle is controlled to form the plurality of dimples on the surface of the coated layer, thus allowing the dimples to act as oil pockets, as described above.

Figure 6:
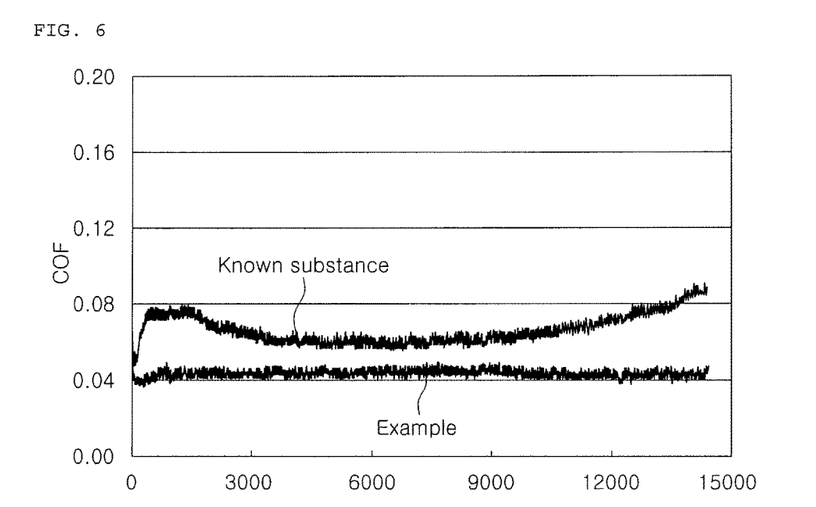
FIG. 6 is a graph showing a change in a friction coefficient as a function of a time of a known substance and an example according to the present disclosure.

As seen from the graph of FIG. 6, the friction coefficient of the vehicle including the piston skirt coated with a PTFE coating solution according to the present disclosure is about 33% lower than that of a known substance, and accordingly, fuel efficiency of the vehicle is about 0.3% improved. Fuel efficiency may be expected to be improved by only replacing the coating solution without necessitating a reduction in weight of the vehicle body.

Figure 2:
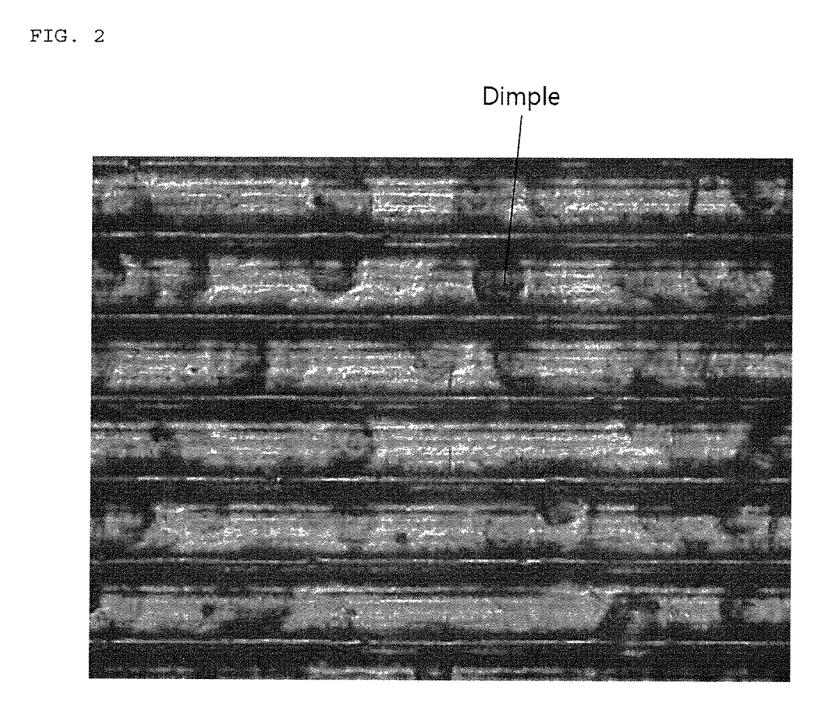
FIG. 2 is an enlarged picture showing a surface of a coated layer according to an embodiment of the present disclosure.
Figure 3:
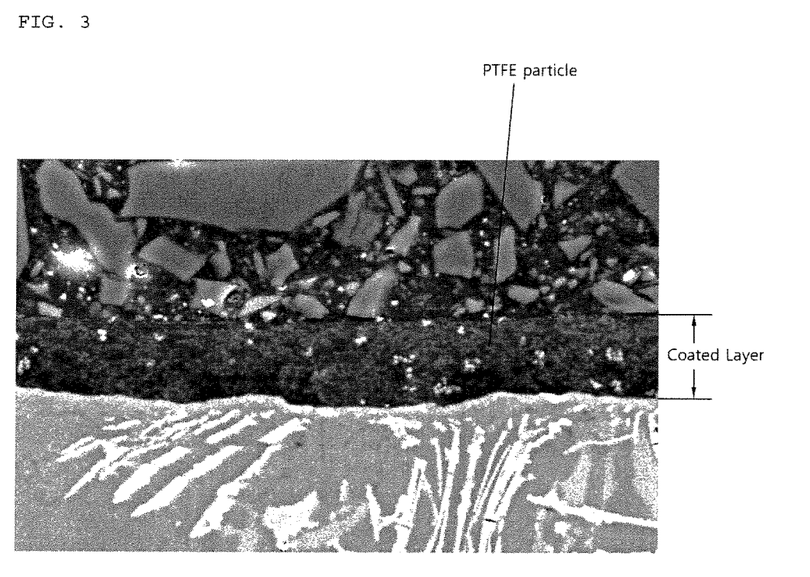
FIG. 3 is a picture showing a distribution of PTFE particles according to an embodiment of the present disclosure.

As confirmed from FIG. 2, the plurality of dimples formed on the coated layer may each have a diameter of 50 to 350 μm, and the density of the distributed dimples may be 0.5 to 10 dimples/mm². When the diameter of the dimple is less than 50 μm, the dimple may not smoothly act as the oil pocket containing oil, and when the diameter of the dimple is more than 350 μm, the depth of the dimple may be larger than the thickness of the coated layer, and accordingly, the diameter of the dimple may be limited to 50 to 350 μm. When the density of the distributed dimples is less than 0.5 dimples/mm², the dimples may contain insufficient oil to reduce friction, and when the number of the distributed dimples is more than 10 dimples/mm², a durability of the coated layer may be reduced. Accordingly, the density of the distributed dimples may be limited to 0.5 to 10 dimples/mm².

Meanwhile, the viscosity of the coating solution may be determined preferably between 15000 to 35000 cps, and more preferably, may be limited to 20000 to 26000 cps in order to perform minimum coating. Further, the solid content of the coating solution may be 30 to 50% so as to satisfy the aforementioned condition. When the viscosity of the coating solution is less than 20000 cps, it may be difficult to obtain the sufficient coating thickness, and when the viscosity is more than 26000 cps, coating meshes may be clogged. Therefore, it is preferable that the viscosity of the coating solution be limited to 20000 to 26000 cps.

The piston skirt portion may be subjected to alkali etching before coating. Sodium hydroxide (NaOH) may be used during alkali etching. More specifically, the piston skirt portion may be etched using a 10 wt % sodium hydroxide solution for 9 to 11 sec and then washed using ultrasonic waves in a 50 wt % nitric acid ($HNO_3$) solution for 50 to 70 sec. The surface to be coated may be made rough using alkali etching to improve adhesion strength between the coating solution and the surface of the piston skirt. When an etching time is less than 9 sec, etching may be insufficiently performed to hinder satisfactory surface roughness from being obtained, and when the etching time is more than 11 sec, etching may be excessively performed to reduce physical properties of the coated surface after coating. A preferable mesh size is about 150 to 180 mesh during screen printing.

After the coating step during which the coated layer may be formed on the surface of the piston skirt, the coated layer may be stabilized using natural wind or hot wind drying and calcined, namely heat-treated, to be cured at 200 to 220° C. for 10 to 20 min. When a heat-treating temperature is less than 200° C., the coating solution may be insufficiently cured to reduce wear resistance, and when the heat-treating temperature is more than 220° C., the piston skirt may be deformed by heat. Therefore, it is preferable that the heat-treating temperature be limited to 200 to 220° C.

A vehicle part coated with a PTFE coating solution according to the present disclosure includes a piston skirt, and a coated layer formed on a surface of the piston skirt using a coating solution which includes a dispersion solution including diamond powder dispersed in an organic solvent, a silane solution, and a PTFE solution including PTFE (polytetrafluoroethylene) particles having a size of 0.1 to 6 μm. A plurality of dimples each having a diameter of 50 to 350 μm may be distributed on the surface of the coated layer, and the density of the plurality of distributed dimples may be 0.5 to 10 dimples/mm².

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of applying a PTFE (polytetrafluoroethylene) solution, comprising:
   a dispersion step of dispersing a diamond powder in an organic solvent using bead milling to manufacture a dispersion solution;
   a mixing step of mixing a silane solution with the dispersion solution to manufacture a mixture solution;
   an addition step of adding the PTFE solution including PTFE particles having a size of 0.1 to 6 µm to the mixture solution to manufacture a coating solution;
   a coating step of applying the manufactured coating solution on a surface of a piston skirt to form a coated layer including a plurality of dimples distributed thereon; and
   a curing step of drying and heat-treating the coated layer, wherein the plurality of dimples each has a diameter of 50 to 350 µm, and wherein a density of the plurality of dimples is 0.5 dimples/mm$^2$ to 10 dimples/mm$^2$.

2. The method of claim 1, wherein a particle size of the diamond powder dispersed in the organic solvent during the dispersion step is 100 to 400 nm.

3. The method of claim 1, wherein 100 parts by weight of the organic solvent and 5 to 10 parts by weight of the diamond powder are mixed to manufacture the dispersion solution during the dispersion step.

4. The method of claim 1, wherein the silane solution has an amino functional group.

5. The method of claim 1, wherein 100 parts by weight of the diamond powder and 2 to 6 parts by weight of the silane solution are mixed to manufacture the mixture solution during the mixing step.

6. The method of claim 1, wherein the coating solution manufactured during the addition step has a viscosity of 20000 to 26000 cps.

7. The method of claim 1, wherein the heat-treating is performed at 200 to 220 C for 10 to 20 min during the curing step.

* * * * *